United States Patent
Grant, Jr.

(10) Patent No.: US 6,397,645 B1
(45) Date of Patent: Jun. 4, 2002

(54) VEHICLE ANTI-THEFT ACCELERATOR LOCK

(76) Inventor: Deloash Grant, Jr., 6729 Rockwell Blvd. West, Charlotte, NC (US) 28269

( * ) Notice: Subject to any disclaimer, the term of this patent is extended or adjusted under 35 U.S.C. 154(b) by 0 days.

(21) Appl. No.: 09/718,243

(22) Filed: Nov. 22, 2000

(51) Int. Cl.$^7$ .............................................. F16H 57/00
(52) U.S. Cl. .............................. 70/202; 70/201; 70/237
(58) Field of Search ........................... 70/198–203, 237; 16/82; 292/259 R, 388, 389, DIG. 15, 29, 30

(56) References Cited

U.S. PATENT DOCUMENTS

| | | | |
|---|---|---|---|
| 1,267,926 A | * 5/1918 | Snow et al. | 70/202 |
| 1,343,459 A | * 6/1920 | Lacy | 70/199 |
| 1,385,479 A | 7/1921 | Stanley | |
| 1,388,149 A | * 8/1921 | Friedrich | 70/203 |
| 1,442,203 A | * 1/1923 | Williams et al. | 70/202 |
| 1,444,379 A | 2/1923 | Jones | |
| 1,527,992 A | * 3/1925 | Norton | 70/200 |
| 3,613,410 A | * 10/1971 | Shaw | 70/202 |
| 3,833,963 A | * 9/1974 | Waters | 292/DIG. 15 X |
| 4,632,209 A | * 12/1986 | Russell | 70/199 X |
| 4,660,878 A | * 4/1987 | Neverson | 70/199 X |
| 4,747,465 A | * 5/1988 | Hodgson | 70/200 X |
| 4,876,865 A | 10/1989 | Trinidad et al. | |
| D312,200 S | 11/1990 | Bhagwat | |
| 5,181,404 A | 1/1993 | Baker | |
| 5,226,201 A | * 7/1993 | Lefebvre | 292/DIG. 15 X |
| 5,359,868 A | 11/1994 | Villani | |
| 5,454,610 A | * 10/1995 | Taylor et al. | 292/DIG. 15 X |
| 5,537,846 A | * 7/1996 | Simon | 70/201 X |
| 5,890,751 A | * 4/1999 | Seffinga | 292/DIG. 15 X |
| 6,085,559 A | * 7/2000 | Jarrett | 70/202 |
| 6,131,424 A | * 10/2000 | Dixon | 70/237 X |
| 6,161,252 A | * 12/2000 | Rodriguez | 292/338 X |

FOREIGN PATENT DOCUMENTS

| | | | | |
|---|---|---|---|---|
| FR | 999336 | * | 1/1952 | 70/200 |
| FR | 1207972 | * | 2/1960 | 70/202 |
| GB | 2263260 | * | 7/1993 | 70/199 |

* cited by examiner

*Primary Examiner*—Suzanne Dino Barrett

(57) ABSTRACT

A vehicle anti-theft accelerator lock for preventing the accelerator pedal of a vehicle from being depressed by a person attempting to steal the vehicle. The vehicle anti-theft accelerator lock includes a base assembly including a base member being adapted to be securely attached to a floor of a vehicle, and also including a shoe support member being securely fastened with fasteners to the base member; and further includes a shoe member being adapted to cover an accelerator pedal of the vehicle and being adapted to lockingly mount to the base assembly for preventing unauthorized use of the accelerator pedal; and also includes a locking member for locking the shoe member to the base assembly.

17 Claims, 3 Drawing Sheets

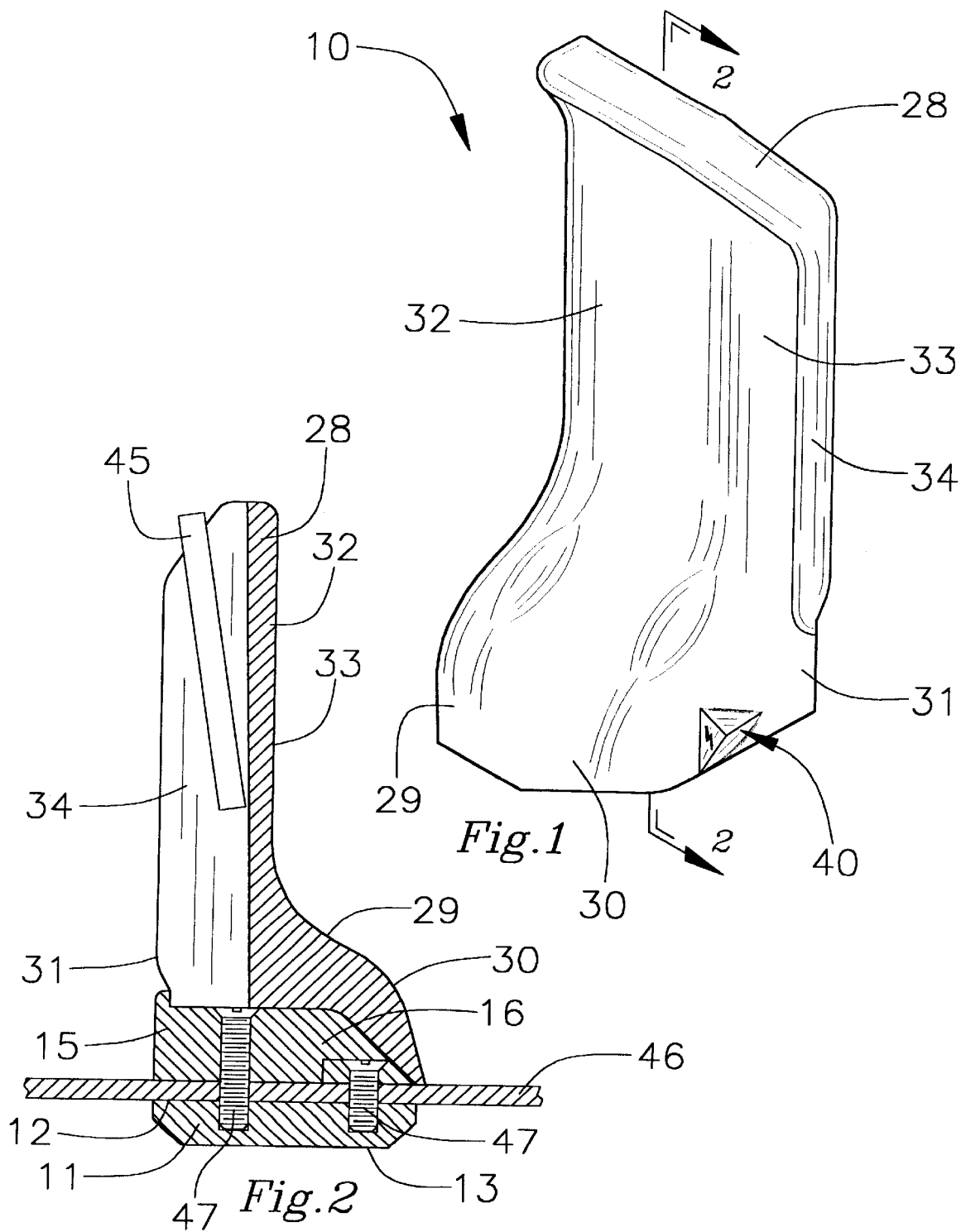

US 6,397,645 B1

VEHICLE ANTI-THEFT ACCELERATOR LOCK

BACKGROUND OF THE INVENTION

1. Field of the Invention

The present invention relates to an accelerator lock and more particularly pertains to a new vehicle anti-theft accelerator lock for preventing the accelerator pedal of a vehicle from being depressed by a person attempting to steal the vehicle.

2. Description of the Prior Art

The use of an accelerator lock is known in the prior art. More specifically, an accelerator lock heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,444,379; U.S. Pat. No. 5,359,868; U.S. Pat. No. 1,385,479; U.S. Pat. No. 4,876,865; U.S. Pat. No. 5,181,404; and U.S. Pat. No. Des. 312,200.

While these devices fulfill their respective, particular objectives and requirements, the aforementioned patents do not disclose a new vehicle anti-theft accelerator lock. The inventive device includes a base assembly including a base member being adapted to be securely attached to a floor of a vehicle, and also including a shoe support member being securely fastened with fasteners to the base member; and further includes a shoe member being adapted to cover an accelerator pedal of the vehicle and being adapted to lockingly mount to the base assembly for preventing unauthorized use of the accelerator pedal; and also includes a locking member for locking the shoe member to the base assembly.

In these respects, the vehicle anti-theft accelerator lock according to the present invention substantially departs from the conventional concepts and designs of the prior art, and in so doing provides an apparatus primarily developed for the purpose of preventing the accelerator pedal of a vehicle from being depressed by a person attempting to steal the vehicle.

SUMMARY OF THE INVENTION

In view of the foregoing disadvantages inherent in the known types of accelerator lock now present in the prior art, the present invention provides a new vehicle anti-theft accelerator lock construction wherein the same can be utilized for preventing the accelerator pedal of a vehicle from being depressed by a person attempting to steal the vehicle.

The general purpose of the present invention, which will be described subsequently in greater detail, is to provide a new vehicle anti-theft accelerator lock which has many of the advantages of the accelerator lock mentioned heretofore and many novel features that result in a new vehicle anti-theft accelerator lock which is not anticipated, rendered obvious, suggested, or even implied by any of the prior art accelerator lock, either alone or in any combination thereof.

To attain this, the present invention generally comprises a base assembly including a base member being adapted to be securely attached to a floor of a vehicle, and also including a shoe support member being securely fastened with fasteners to the base member; and further includes a shoe member being adapted to cover an accelerator pedal of the vehicle and being adapted to lockingly mount to the base assembly for preventing unauthorized use of the accelerator pedal; and also includes a locking member for locking the shoe member to the base assembly.

There has thus been outlined, rather broadly, the more important features of the invention in order that the detailed description thereof that follows may be better understood, and in order that the present contribution to the art may be better appreciated. There are additional features of the invention that will be described hereinafter-and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle anti-theft accelerator lock which has many of the advantages of the accelerator lock mentioned heretofore and many novel features that result in a new vehicle anti-theft accelerator lock which is not anticipated, rendered obvious, suggested, or even implied by any of the prior art accelerator lock, either alone or in any combination thereof.

It is another object of the present invention to provide a new vehicle anti-theft accelerator lock which may be easily and efficiently manufactured and marketed.

It is a further object of the present invention to provide a new vehicle anti-theft accelerator lock which is of a durable and reliable construction.

An even further object of the present invention is to provide a new vehicle anti-theft accelerator lock which is susceptible of a low cost of manufacture with regard to both materials and labor, and which accordingly is then susceptible of low prices of sale to the consuming public, thereby making such vehicle anti-theft accelerator lock economically available to the buying public.

Still yet another object of the present invention is to provide a new vehicle anti-theft accelerator lock which provides in the apparatuses and methods of the prior art some of the advantages thereof, while simultaneously overcoming some of the disadvantages normally associated therewith.

Still another object of the present invention is to provide a new vehicle anti-theft accelerator lock for preventing the accelerator pedal of a vehicle from being depressed by a person attempting to steal the vehicle.

Yet another object of the present invention is to provide a new vehicle anti-theft accelerator lock which includes a base assembly including a base member being adapted to be securely attached to a floor of a vehicle, and also including a shoe support member being securely fastened with fasteners to the base member; and further includes a shoe member being adapted to cover an accelerator pedal of the vehicle and being adapted to lockingly mount to the base assembly for preventing unauthorized use of the accelerator pedal; and also includes a locking member for locking the shoe member to the base assembly.

Still yet another object of the present invention is to provide a new vehicle anti-theft accelerator lock that is easy and convenient to install and use.

Even still another object of the present invention is to provide a new vehicle anti-theft accelerator lock that makes it impossible for the thief to tamper with a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 a perspective view of a new vehicle anti-theft accelerator lock according to the present invention.

FIG. 2 is a side cross-sectional view of the present. invention.

DESCRIPTION OF THE PREFERRED EMBODIMENT

Figure 3:
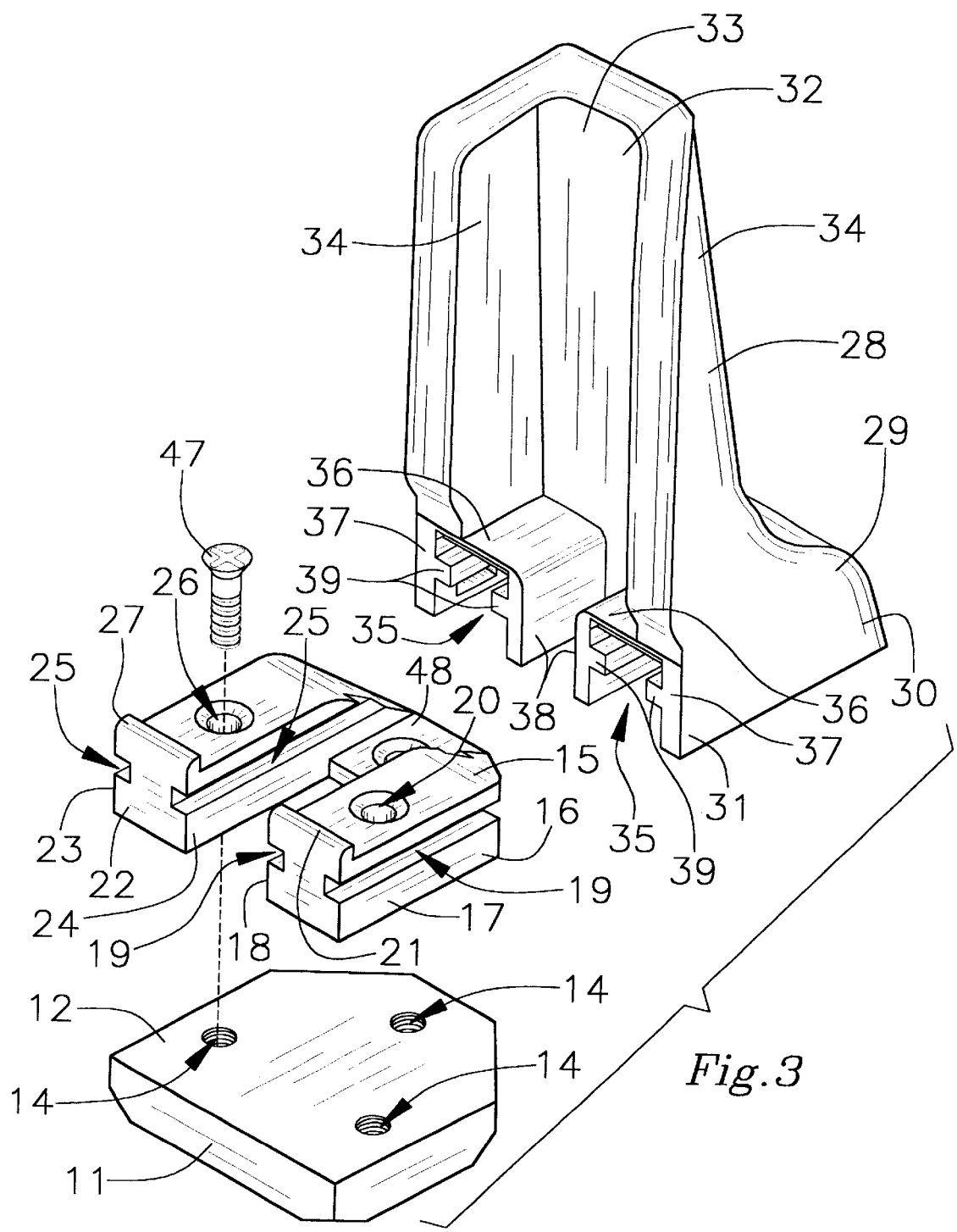
FIG. 3 is an exploded perspective view of the present invention.
Figures 4, 5:
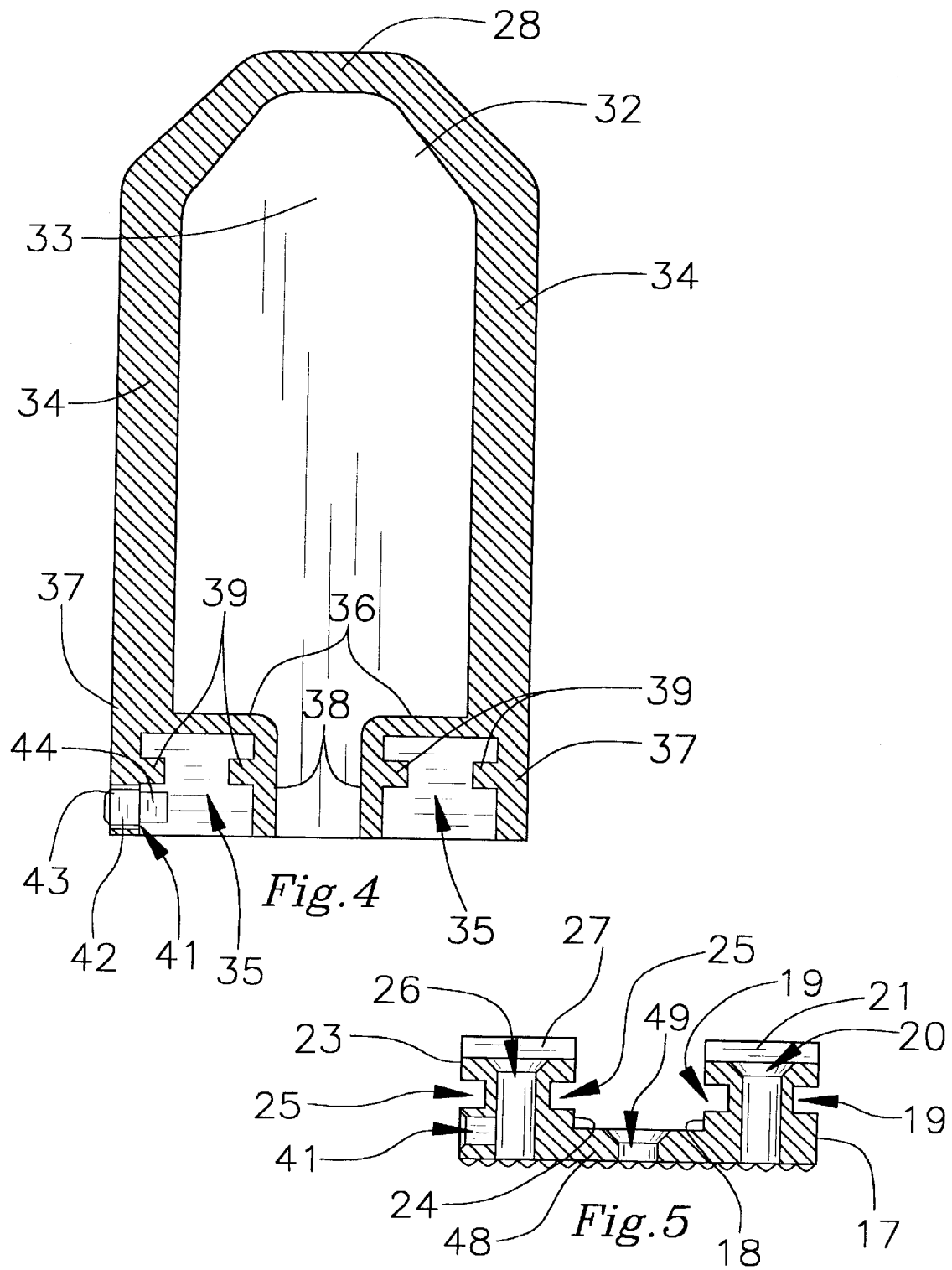
FIG. 4 is a rear cross-sectional view of the shoe member of the present invention.
FIG. 5 is a rear cross-sectional view of the shoe support member of the present invention.

With reference now to the drawings, and in particular to FIGS. 1 through 5 thereof, a new vehicle anti-theft accelerator lock embodying the principles and concepts of the present invention and generally designated by the reference numeral 10 will be described.

As best illustrated in FIGS. 1 through 5, the vehicle anti-theft accelerator lock 10 generally comprises a base assembly including a base member 11 being adapted to be securely and conventionally attached to a floor 46 of a vehicle, and also includes a shoe support member 15 being securely fastened with fasteners 47 to the base member 11. The base member 11 is a plate having a top side 12 and a bottom side 13 with holes 14 being disposed through the top and bottom sides 12,13 thereof. The shoe support member 15 includes elongate side members 16,22 being spaced apart and being interconnected with a cross member 48 which is securely and conventionally attached at first ends of the elongate side members 16,22 and which has a top side and a bottom side with a hole 49 being disposed through the top and bottom sides thereof. Each of the elongate side members 16,22 includes longitudinal grooves 19,25 being disposed in outer 17,23 and inner 18,24 sides and extending a length thereof, and also includes a top side and a bottom side with a hole 20,26 being disposed through the top and bottom sides, and further includes a flange 21,27 being integrally disposed upon the top side at a second end thereof. Each of the elongate side members 16,22 has a tapered first end portion.

A shoe member 28 is adapted to cover an accelerator pedal 45 of the vehicle and is adapted to lockingly mount to the base assembly for preventing unauthorized use of the accelerator pedal 45. The shoe member 28 includes a base portion 29 and an upstanding wall 32 being integrally attached to the base portion 29 and having a main portion 33 and longitudinal side portions 34 which are angled relative to the main portion 33 thus forming a U-shape as viewed from a top thereof. The upstanding wall 32 is adapted to receive the accelerator pedal 45 between the longitudinal side portions 34 thereof. The base portion 29 having a toe portion 30 and a heel portion 31, and also has a pair of channels 35 being spaced apart and extending through the heel portion 31 and into the toe portion 30. Each of the channels 35 is defined by a top wall 36 and side walls 37,38. The base portion further has elongate flanges 39 being disposed in the channels 35 and being securely and integrally attached to interiors of the side walls 37,38 of the channels 35. The flanges 39 are spaced from the top walls 36 of the channels 35 and extend a length of the channels 35 thus forming tracks upon which the elongate side members 16,22 of the shoe support member 15 are received. The base portion 29 of the shoe member 28 also includes a recessed portion 40 extending in a side wall thereof, and also includes an opening 41 extending through the recessed portion 40 into one of the channels 35.

A locking member 42 for locking the shoe member 28 to the base assembly includes a cylindrical housing 43 being removably disposed in the opening 40 of the base portion 29, and also includes a bolt member 44 being lockingly extendable from the cylindrical housing 43 and into the channel 15 for locking the shoe member 28 to the shoe support member 15. The cylindrical housing 43 has a key-receiving port being disposed in an end thereof for moving the bolt member 44.

In use, the user slides the shoe member 28 upon the shoe support member 15 and extends and lock the bolt member 44 into the channel 35 of the shoe member 28 to prevent the removal of the shoe member 28 from the shoe support member 15 and to prevent unauthorized use of the accelerator pedal 45 thus preventing someone from stealing one's vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle anti-theft accelerator lock comprising:

a base assembly for mounting to a floor of a vehicle below an accelerator pedal, said base assembly including a shoe support member for mounting on the floor on an upper surface of the floor;

a shoe member for positioning forwardly of the accelerator pedal to restrict access to the accelerator pedal of the vehicle when said base assembly is mounted on said base assembly for preventing unauthorized use of the accelerator pedal, said shoe member being slidable onto said base assembly for mounting said shoe member in a blocking position adjacent to and extending about a portion of the accelerator pedal when said base assembly is mounted on the vehicle, said shoe member being slidably out of said blocking position and being removable from said base assembly for permitting access to the accelerator pedal; and a locking member for releasably locking said shoe member to said base assembly in said blocking position.

2. A vehicle anti-theft accelerator lock as described in claim 1, wherein said base assembly comprises a base member having a top side and a bottom side with holes being disposed through said top and bottom sides thereof.

3. A vehicle anti-theft accelerator lock as described in claim 2, wherein said shoe support member includes elongate side members interconnected with a cross member which is attached at first ends of said elongate side members and which has a top side and a bottom side with a hole being disposed through said top and bottom sides thereof.

4. A vehicle anti-theft accelerator lock as described in claim 3, wherein each of said elongate side members includes longitudinal grooves being disposed in outer and inner sides and extending a length thereof, and also includes a top side and a bottom side with a hole being disposed through said top and bottom sides, and further includes a flange being disposed upon said top side at a second end thereof.

5. A vehicle anti-theft accelerator lock as described in claim 1, wherein said shoe member includes a base portion and an upstanding wall being integrally attached to said base portion and having a main portion and longitudinal side portions which are angled relative to said main portion thus forming a U-shape as viewed from a top thereof, said upstanding wall being adapted to receive the accelerator pedal between said longitudinal side portions thereof.

6. A vehicle anti-theft accelerator lock as described in claim 5, wherein said base portion has a toe portion and a heel portion, and also has a pair of channels being spaced apart and extending through said heel portion and into said toe portion, each of said channels being defined by a top wall and side walls.

7. A vehicle anti-theft accelerator lock as described in claim 6, wherein said base portion further has elongate flanges being disposed in said channels and being attached to interiors of said side walls of said channels, said flanges being spaced from said top walls of said channels and extending a length of said channels thus forming tracks in which elongate side members of said shoe support member are received.

8. A vehicle anti-theft accelerator lock as described in claim 6, wherein said base portion of said shoe member also includes a recessed portion extending in a side wall thereof, and also includes an opening extending through said recessed portion into one of said channels.

9. A vehicle anti-theft accelerator lock as described in claim 8, wherein said locking member includes a cylindrical housing being removably disposed in said opening of said base portion, and also includes a bolt member being lockingly extendable from said cylindrical housing and into said channel for locking said shoe member to said shoe support member, said cylindrical housing having a key-receiving port being disposed in an end thereof for moving said bolt member.

10. A vehicle anti-theft accelerator lock comprising:

a base assembly including a base member being adapted to be securely attached to a floor of a vehicle, and also including a shoe support member being securely fastened with fasteners to said base member;

a shoe member being adapted to cover an accelerator pedal of the vehicle and being adapted to lockingly mount to said base assembly for preventing unauthorized use of the accelerator pedal; and a locking member for locking said shoe member to said base assembly;

wherein said base member is a plate having a top side and a bottom side with holes being disposed through said top and bottom sides thereof;

wherein said shoe support member includes elongate side members being spaced apart and being interconnected with a cross member which is securely attached at first ends of said elongate side members and which has a top side and a bottom side with a hole being disposed through said top and bottom sides thereof;

wherein each of said elongate side members includes longitudinal grooves being disposed in outer and inner sides and extending a length thereof, and also includes a top side and a bottom side with a hole being disposed through said top and bottom sides, and further includes a flange being disposed upon said top side at a second end thereof.

11. A vehicle anti-theft accelerator lock as described in claim 10, wherein each of said elongate side members has a tapered first end portion.

12. A vehicle anti-theft accelerator lock as described in claim 10, wherein said shoe member includes a base portion and an upstanding wall being integrally attached to said base portion and having a main portion and longitudinal side portions which are angled relative to said main portion thus forming a U-shape as viewed from a top thereof, said upstanding wall being adapted to receive the accelerator pedal between said longitudinal side portions thereof.

13. A vehicle anti-theft accelerator lock as described in claim 10, wherein said base portion has a toe portion and a heel portion, and also has a pair of channels being spaced apart and extending through said heel portion and into said toe portion, each of said channels being defined by a top wall and side walls.

14. A vehicle anti-theft accelerator lock as described in claim 13, wherein said base portion further has elongate flanges being disposed in said channels and being attached to interiors of said side walls of said channels, said flanges being spaced from said top walls of said channels and extending a length of said channels thus forming tracks upon which said elongate side members of said shoe support member are received.

15. A vehicle anti-theft accelerator lock as described in claim 13, wherein said base portion of said shoe member also includes a recessed portion extending in a side wall thereof. and also includes an opening extending through said recessed portion into one of said channels.

16. A vehicle anti-theft accelerator lock as described in claim 15, wherein said locking member includes a cylindrical housing being removably disposed in said opening of said base portion, and also includes a bolt member being lockingly extendable from said cylindrical housing and into said channel for locking said shoe member to said shoe support member, said cylindrical housing having a key-receiving port being disposed in an end thereof for moving said bolt member.

17. A vehicle anti-theft accelerator lock comprising: a base assembly including a base member being adapted to be securely attached to a floor of a vehicle, and also including a shoe support member being securely fastened with fasteners to said base member, said base member being a plate having a top side and a bottom side with holes being disposed through said top and bottom sides thereof, said shoe support member including elongate side members being spaced apart and being interconnected with a cross member which is securely attached at first ends of said elongate side members and which has a top side and a bottom side with a hole being disposed through said top and bottom sides thereof, each of said elongate side members including longitudinal grooves being disposed in outer and inner sides and extending a length thereof, and also including a top side and a bottom side with a hole being disposed through said top and bottom sides, and further including a flange being disposed upon said top side at a second end thereof, each of said elongate side members having a tapered first end portion;

a shoe member being adapted to cover an accelerator pedal of the vehicle and being adapted to lockingly mount to said base assembly for preventing unauthorized use of the accelerator pedal, said shoe member including a base portion and an upstanding wall being integrally attached to said base portion and having a main portion and longitudinal side portions which are angled relative to said main portion thus forming a U-shape as viewed from a top thereof, said upstanding wall being adapted to receive the accelerator pedal between said longitudinal side portions thereof, said base portion having a toe portion and a heel portion, and also having a pair of channels being spaced apart and extending through said heel portion and into said toe portion, each of said channels being defined by a top wall and side walls, said base portion further having elongate flanges being disposed in said channels and being securely attached to interiors of said side walls of said channels, said flanges being spaced from said top walls of said channels and extending a length of said channels thus forming tracks upon which said elongate side members of said shoe support member are received, said base portion of said shoe member also including a recessed portion extending in a side wall thereof, and also including an opening extending through said recessed portion into one of said channels; and a locking member for locking said shoe member to said base assembly, said locking member including a cylindrical housing being removably disposed in said opening of said base portion, and also including a bolt member being lockingly extendable from said cylindrical housing and into said channel for locking said shoe member to said shoe support member, said cylindrical housing having a key-receiving port being disposed in an end thereof for moving said bolt member.

\* \* \* \* \*